Oct. 20, 1925. Re. 16,189
A. E. NICHOLLS
OIL FEEDER FOR INTERNAL COMBUSTION ENGINES
Original Filed May 17, 1921
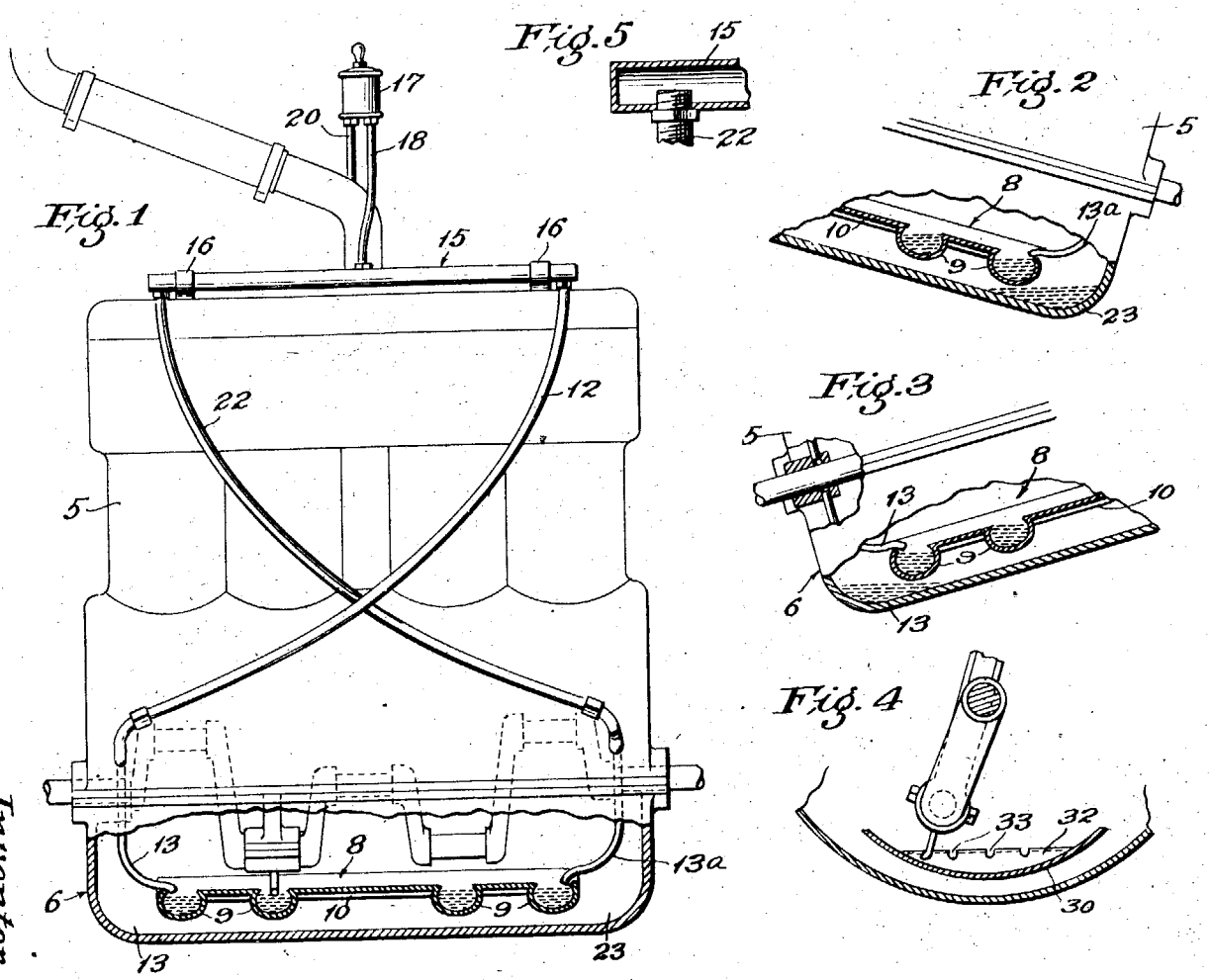
Witness
C. C. Holly
Inventor
Albert E. Nicholls
by James R. Townsend
his atty Reissued Oct. 20, 1925. Re. 16,189

UNITED STATES PATENT OFFICE.

ALBERT E. NICHOLLS, OF BREA, CALIFORNIA.

OIL FEEDER FOR INTERNAL-COMBUSTION ENGINES.

Original No. 1,423,677, dated July 25, 1922, Serial No. 470,346, filed May 17, 1921. Application for reissue filed April 29, 1924. Serial No. 709,927.

*To all whom it may concern:*

Be it known that I, ALBERT E. NICHOLLS, a citizen of the United States, and a resident of Brea, in the county of Orange and State of California, have invented new and useful Improvements in Oil Feeders for Internal-Combustion Engines, of which the following is a specification.

This invention relates to means for lubricating the crank shaft bearings and the connecting rod bearings of internal combustion engines of vehicles at all road inclinations and to provide proper flow of the lubricant over the oil pan so that the splash system of oiling is maintained at its highest efficiency.

An important aim of this invention is to provide novel means whereby the flow of oil to the end crank shaft and connecting rod bearings of an internal combustion engine is automatically regulated and controlled by the position of the engine. For instance, if a vehicle having an engine equipped with the usual lubricating means heretofore known is ascending or descending a hill, the end crank shaft and connecting rod bearings in some instances are drained of oil and in other instances are improperly lubricated because of a faulty splash system, and in accordance with this invention the forward end crank shaft and connecting rod bearings of a motor equipped with my novel lubricating device are provided with an increased flow of oil when the vehicle is ascending a hill and the rear end crank shaft and connecting rod bearings of such motor are provided with an increased flow of oil when the vehicle is descending a hill.

That is to say, when a vehicle is ascending a hill the front end crank shaft and connecting rod bearings of many motors do not receive any oil or receive an insufficient amount of oil for proper lubrication, and an object of this invention is to provide means whereby an increased amount of oil is delivered to such bearings over that ordinarily received by such bearings when the vehicle is ascending a hill.

A further object of the invention is to provide an oil supply system for internal combustion engines which is highly accessible and which does not interfere with the supply of oil which is supplied to the crank shaft and connecting rod bearings when the motor is arranged horizontally.

An object of the invention is to provide novel means for supplying an uninterrupted supply of oil to the elevated crank shaft end and connecting rod bearings of an internal combustion engine.

Other objects and advantages of the invention will be apparent during the course of the following description.

In the accompanying drawings forming a part of this application and in which like numerals are employed to designate like parts throughout the same, Figure 1 is a side elevation of an internal combustion engine equipped with the improved oil supply means, parts being shown in section.

Figure 2 is a fragmental detail view partly in section illustrating the motor in an inclined position.

Figure 3 is a fragmental detail view partly in section showing the motor inclined in the opposite direction.

Figure 4 is a vertical transverse sectional view illustrating a modified form of oil pan.

Figure 5 is a fragmental detail view illustrating the manifold and its connections the manifold being shown in section.

In the drawing, wherein for the purpose of illustration is shown a preferred embodiment of the invention, the numeral 5 generally designates an internal combustion engine provided with the usual crank case 6 within which an oil pan generally designated by the numeral 8 is arranged.

As illustrated in Figure 1, the oil pan which extends longitudinally within the crank case is provided with a plurality of transverse troughs 9 into which the connecting rod bearings dip to receive a quantity of oil. As shown by my United States Patent #1,346,840 communication is established between the transversely extending troughs by means of conduits 10 which are arranged beneath the surface of the oil pan and are connected at their ends to the sides of the troughs. Therefore, when the motor is inclined, the oil will flow from one trough to the other and when the motor is level, the oil contained within the troughs will have the same level.

The invention forming the subject matter of this application resides in supplying an increased quantity of oil to the highest portion of the oil pan and main crank bearings when the motor is ascending a hill and under active labor or when the motor is descending a hill.

That is to say, the quantity of oil delivered to the highest main crank shaft bearings and the highest portion of the oil pan is increased over the amount that normally flows to such parts when the engine is inclined or arranged horizontally; or is increased over the amount that would normally flow to such parts of a motor not equipped with my lubricating means. And I further provide means whereby a quantity of oil is held in reserve and which is promptly discharged onto the highest main crank bearings when either end of the motor is elevated.

Specifically, the means employed for providing the oil pan and main crank shaft bearings with an increased supply of oil when ascending a hill includes an oil manifold 15, extending longitudinally of the motor and having oil pipes 12 and 22 connected to and extending up and into the manifold a convenient distance, the space in said manifold below the tops of said pipes serving to carry a reserve supply of oil when moving on a comparatively level surface, but as soon as either end of the motor is elevated the supply of oil so carried is promptly discharged through pipes 12 or 22, to the main crank shaft bearings and the pan, at 13 and 13[a].

As illustrated in Figure 1, the upper portion of the oil conveying pipe 12 is connected to the rear end of and extends up into the oil manifold 15 which is secured to the upper side of the cylinder by means of fastening devices 16. If the cylinder head is detachable, the fasteners 16 may be secured in position by the bolts which hold the cylinder head in position or in case the cylinder head is integral, the fasteners 16 may be held in position by means of separate bolts.

The oil manifold extends longitudinally of the motor and receives a quantity of oil from an oil cup 17 or other source of supply, such as a pump, the said oil cup being supported above the manifold and connected to the manifold 15 by means of a pipe 18. The oil cup 17 is supplied with oil by means of a distributer pipe 20 which may extend from the main reservoir or supply pump. The oil cup 17 will indicate the condition or circulation of oil through the pipes, and when necessary, constitutes a convenient means of priming.

As soon as the motor is inclined by reason of ascending a hill or otherwise and regardless of the inclination thereof, the flow of oil is started from reserve contained in 15 through pipe 12 or 22, as the case may be, for supplying the forward or rear main crank shaft bearing and connecting rod bearings with an increased quantity of oil. That is to say, the oil will flow through pipe 12 or 22 at any inclination of the motor at which the vehicle may be practically operated and will be discharged into the elevated end of the crank case.

In the form of the invention illustrated in Figure 4, the oil pan generally designated by the numeral 30 is provided with spaced transversely extending troughs 32 adapted for the reception of a quantity of lubricating oil whereby a small quantity of oil is picked up when the connecting rod bearings reach the limit of their downward movement. As further illustrated in this figure the oil pan is provided with longitudinally extending spaced parallel reinforcing corrugations 33 which are open at their ends and establish communication between the troughs 32 so that the oil may flow either to the forward or rear portions of the crank case.

With reference to the foregoing description taken in connection with the accompanying drawings it will be apparent that a lubricating system constructed in accordance with this invention will effectively feed the oil so that an increased quantity of oil is supplied to the bearings most in need of it when either end of the motor is elevated, whereas such bearings would normally not receive any oil, or an insufficient quantity of oil when elevated. Further, the device does not interfere with the pumping of oil to the several bearings or to the oil pan.

In operation when ascending a hill with a vehicle provided with a motor equipped with my lubricating means the oil will be delivered to the oil manifold by pumping the same thereinto through the distributor pipe 20, oil cup 17 and pipe 18 and the oil will then automatically flow by gravity toward the rear end of the manifold due to the inclination or elevation of the motor and will be delivered through the oil conveying pipe 12 into the crank case so that the elevated end bearings receive an increased flow of oil over that normally received under like conditions in an engine not equipped with my lubricating means. The oil then flows onto the oil pan at 13 and into the troughs 9 where it is available to oil the connecting rod bearings and to be sprayed into and on the cylinder walls.

When descending a hill the flow of oil is just the reverse and is delivered onto the highest bearings through the connecting pipe 22.

The oil pan such as shown and described is understood to be the receptacle which contains the oil that is used to lubricate the connecting rod and main shaft bearings. A few other engines cast the oil pan and crank case together and in such case the combined crank case and oil pan are to be considered as the oil pan herein described and claimed.

An advantage gained by the foregoing construction is that all of the oil delivered into the oil conveying pipes from the oil manifold will be delivered to the elevated bearings thus preventing oil from accumulating in the pipes thereby causing the delivery of oil to the elevated bearings to be uninterrupted.

Having thus described the invention, what is claimed is:—

1. The combination with an internal combustion engine having a crank case, of a horizontally arranged longitudinally extending manifold secured to the upper portion of the engine and extending for the major portion of the length of the engine, oil distributing pipes having their upper terminal portions extended into the terminal portions of said manifold and terminating above the lower wall of the interior of the manifold thereby providing an oil reserve space extending for the entire length of the manifold, said oil distributing pipes being crossed and having their lower terminal portions connected to said crank case.

2. The combination with an internal combustion engine having main bearings and an oil pan provided with troughs, of an oil manifold secured to the upper portion of said engine and extending longitudinally of the same, and separate branch pipes connected to and extending into said manifold and discharging onto the main bearings and trough, said branch pipes being inclined and crossed, whereby the elevated main bearings are supplied with an increased supply of oil.

3. The combination with an internal combustion engine having cylinders and an oil pan provided with troughs, of a horizontal oil manifold connected to the upper portion of said cylinders, and inclined pipes extending into said horizontal manifold and terminating above the bottom of the same, thereby defining an oil reserve space.

4. The combination with an internal combustion engine having main bearings and an oil pan, of an oil manifold secured in a horizontal position to the upper portion of said engine, crossed separate pipes extending into the terminal portions of said manifold and terminating between the upper and lower sides of the manifold thereby defining an oil reserve space, and means to supply oil to said manifold between said pipes, said pipes being arranged to supply oil to the main bearings and the oil pan.

5. An oil pan comprising a body having a plurality of spaced transversely extending troughs adapted for the reception of oil and spaced longitudinally extending reinforcing corrugations opening into said troughs and establishing communication between the same.

6. The combination with an internal combustion engine having main bearings and an oil pan, of an oil manifold secured to the upper portion of said engine and extending longitudinally of the same, and separate branch pipes connected to said manifold and discharging onto the main bearings and oil pan, said branch pipes being inclined and crossed, whereby the elevated main bearings are supplied with an increased supply of oil.

7. The combination with an internal combustion engine having main bearings and an oil pan provided with troughs, of an oil manifold secured to said engine; pipes connected to said manifold and discharging onto the main bearings, said pipes being inclined and crossed; and means for directing oil from said main bearings to the troughs in said pan.

Signed at Los Angeles, California, this 22nd day of April, 1924.

ALBERT E. NICHOLLS.